United States Patent

Svensson et al.

[11] Patent Number: 5,238,476
[45] Date of Patent: Aug. 24, 1993

[54] FILTER DEVICE, PARTICULARLY INTAKE AIR FILTER DEVICE FOR COMBUSTION ENGINES

[75] Inventors: Per Svensson; Sten Klippare, both of Göteborg, Sweden

[73] Assignee: AB Volvo, Göteborg, Sweden

[21] Appl. No.: 781,211

[22] PCT Filed: Apr. 4, 1990

[86] PCT No.: PCT/SE90/00480

§ 371 Date: Feb. 21, 1992

§ 102(e) Date: Feb. 21, 1992

[87] PCT Pub. No.: WO91/00424

PCT Pub. Date: Jan. 10, 1991

[30] Foreign Application Priority Data

Jul. 5, 1989 [SE] Sweden ............... 8902441

[51] Int. Cl.⁵ ............... B01D 46/12; B01D 29/58
[52] U.S. Cl. ............... 55/486; 55/487; 55/502; 55/507
[58] Field of Search ............... 55/486, 487, 502, 503, 55/505, 507

[56] References Cited

U.S. PATENT DOCUMENTS

| | | | |
|---|---|---|---|
| 3,442,067 | 5/1969 | Swenson | 55/502 X |
| 3,488,928 | 1/1970 | Tarala | 55/505 X |
| 3,672,130 | 6/1972 | Sullivan et al. | 55/507 X |
| 4,006,000 | 2/1977 | Tortorici et al. | 55/507 X |
| 4,135,899 | 1/1979 | Gauer | 55/503 X |
| 4,211,543 | 7/1980 | Tokar et al. | 55/503 X |
| 4,261,710 | 4/1981 | Sullivan | 55/507 X |
| 4,278,455 | 7/1981 | Nardi | 55/502 X |
| 4,304,580 | 12/1981 | Gehl et al. | 55/507 X |
| 4,491,460 | 1/1985 | Tokar | 55/337 |
| 4,595,401 | 6/1986 | Witchell | 55/505 X |
| 4,640,698 | 2/1987 | Ohishi et al. | 55/503 X |
| 5,042,999 | 8/1991 | Ernst et al. | 55/503 X |
| 5,082,476 | 1/1992 | Kahlbaugh et al. | 55/487 X |
| 5,120,337 | 6/1992 | Benzler et al. | 55/502 X |
| 5,137,557 | 8/1992 | Behrendt et al. | 55/502 X |

FOREIGN PATENT DOCUMENTS 2626008 11/1977 Fed. Rep. of Germany.
3518076 11/1985 Fed. Rep. of Germany.
55-43263 3/1980 Japan.

*Primary Examiner*—Robert Spitzer
*Attorney, Agent, or Firm*—Young & Thompson

[57] ABSTRACT

A filter device, especially an intake air filter for internal combustion engines, comprises a cylindrical filter housing (1) with inlet and outlet openings (7, 6) for the medium. In the outlet opening, the pipe stub (11) is fixed with the aid of an elastic sleeve (12). The pipe stub is solidly joined to a secondary or safety filter (20) which extends within a main filter (2), which has a radial seal (17) which seals against a portion (11a) of the pipe stub extending into the housing.

6 Claims, 1 Drawing Sheet

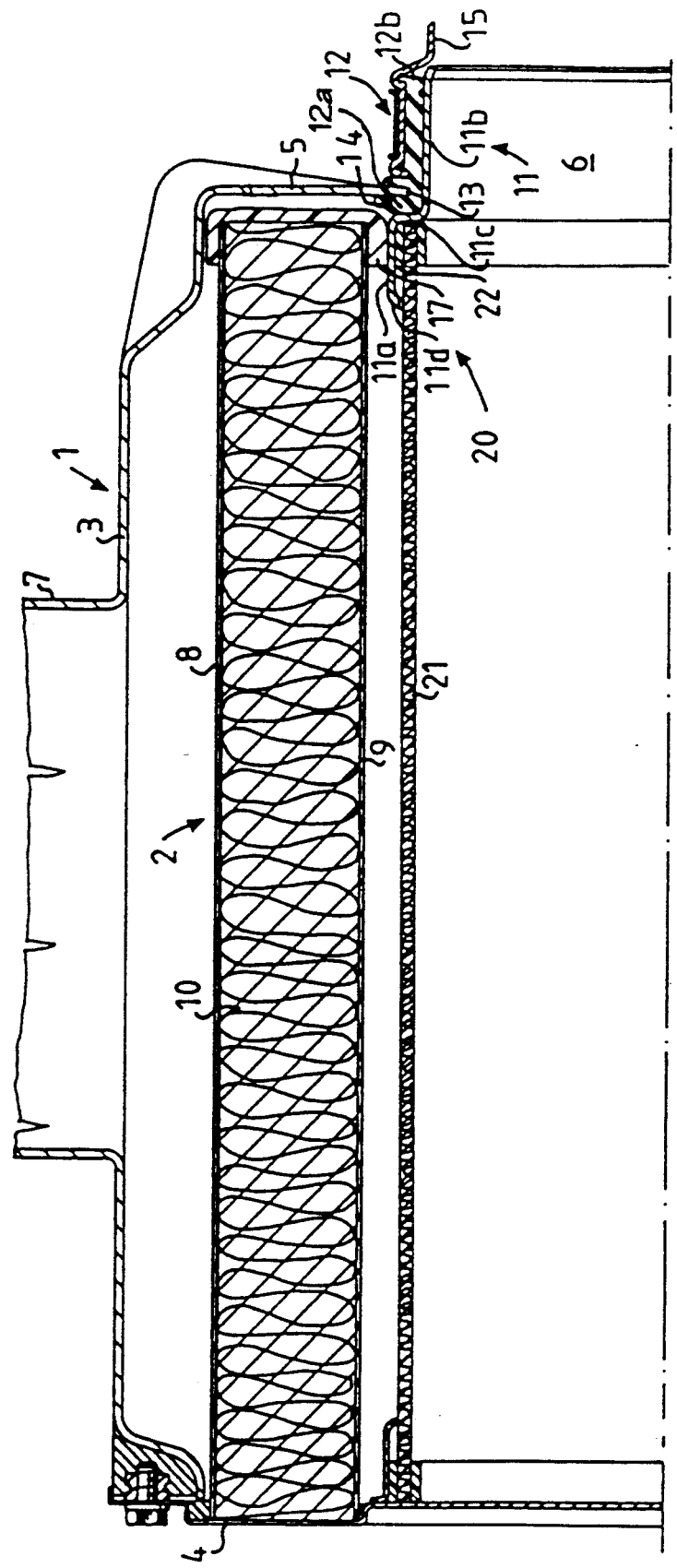

FILTER DEVICE, PARTICULARLY INTAKE AIR FILTER DEVICE FOR COMBUSTION ENGINES

FIELD OF THE INVENTION

The present invention relates to a filter device for filtering a gaseous medium, comprising a filter housing with an inlet opening and an outlet opening for the medium, a tubular filter element enclosed in the housing and disposed between said openings, and a pipe stub coupled to the outlet opening of the housing for coupling to a gas conduit, said pipe stub protruding axially from the outlet opening.

BACKGROUND OF THE INVENTION

A common type of air filter for internal combustion engines has a cylindrical filter housing with the outlet opening at one end. The pipe stub for connecting the filter to an intake conduit is fixed to the housing end plate and the tubular filter element has one end against the end surface surrounding the outlet with a seal therebetween, which is compressed when the filter body is pressed against the outlet end plate by the other end plate of the housing which serves as a cover when in place.

These axially sealing filters have a major disadvantage. Due to the fact that the filter must be fitted between the housing end plates, special attention must be payed to the axial dimensions of the filter element and the filter housing. Any deviations can result in leakage or damage to the filter element.

A known solution to this problem is to seal the filter element radially. The filter element is provided on its inner lateral surface at its outlet end with an inner sealing ring, which seals against a pipe end forming an extension of the outlet stub extending into the filter housing. The axial fit between the filter element and the filter housing is thereby not as critical as in axially sealing filters.

Common to the two known filter types described is, however, that it is difficult when replacing a filter to prevent dirt on the surface of the used filter or on the inside of the filter housing from getting onto the "clean side" of the new filter.

For axially sealing filters it is known to use a secondary or safety filter (which will be referred to below as a secondary filter) concentrically inside the tubular main filter. Such a filter prevents particles from getting on to the clean side of the air filter when replacing the primary filter. It also prevents particles, which for some reason have passed by the primary filter, if it is damaged, for example, from being sucked into the engine. In order to fix the secondary filter in the filter housing, according to one known design, a so-called center rod is used which extends centrally through the filter and presses one end of the filter against a housing end plate. Such an arrangement places great demands on the rigidity of the housing and cannot be used in an entirely plastic housing.

SUMMARY OF THE INVENTION

The purpose of the present invention is to provide a simple filter device, consisting of few parts, of the type described by way of the introduction, which removes the problems described above as well as additional problems, particularly in connection with radially sealing filters.

This is achieved according to the invention by virtue of the fact that the pipe stub is detachably joined to the housing and is solidly joined to a secondary filter disposed inside the tubular filter element, in order to be removed from the housing together with the secondary filter.

The outer surface of the pipe stub can be the surface which is in contact with a sealing ring of a radially sealing primary filter element. Such an angular sealing surface extending into the filter housing cannot be made in one piece with the filter housing when blow moulding is employed. This means that the design according to the invention is particularly advantageous together with blow moulded plastic housings, but it can of course also be used in housings produced by other methods and in other materials. The design according to the invention also means that no other fastening means are required than a simple rubber sleeve to fix the pipe stub to the housing, as will be described below.

BRIEF DESCRIPTION OF THE DRAWINGS

The invention will be described in more detail with reference to an example shown in the accompanying drawing, which is a longitudinal section through the upper half of an intake filter of an internal combustion engine.

DETAILED DESCRIPTION OF THE INVENTION

The reference numeral 1 in FIG. 1 generally designates a filter housing and the reference numeral 2 generally designates a main filter element enclosed in the housing 1. The housing 1 consists of a cylindrical element 3 of blow moulded plastics material, for example, with end plates 4 and 5, of which end plate 4 forms a cover screwed onto the cylinder 3 and fixed to the filter element, whereas the end plate 5 is integral with the cylinder 3 and has an outlet opening 6. An inlet pipe 7 opens into the cylinder 3. The filter element 2 comprises a pair of perforated coaxial cylinders 8 and 9 with an intermediate filter material 10 of a type which is known per se, e.g. folded paper or steel wool.

A pipe stub 11 in plastic or metal is solidly joined to a secondary or safety filter 20 consisting of a perforated tube or a cylindrical net 21, the right end of which is covered with an elastomer, the radially outer portion 22 of which forms a seal against the pipe stub 11. As an alternative, the secondary filter can be glued directly to the pipe stub. The stub 11 is fixed in the housing opening 6 with the aid of a sleeve 12 of rubber or a material similar to rubber. The stub has a portion 11a of larger diameter and a portion 11b of smaller diameter and a radial wall portion 11c forming a transition between the portions 11a and 11b. The sleeve 12 has a thicker portion 12a and a thinner portion 12b. The end of the sleeve 12 extends out to the outer end of the pipe stub 11. The thicker portion 12a of the sleeve 12 has a peripheral groove 13, into which an edge portion 14 of the housing wall 5 extends. The end 15 of an engine intake conduit is forced over sleeve portion 12b and is held in place by a hose clamp. If the installation permits a relatively rigid intake conduit, the outer portion of the pipe stub can be extended towards the engine so that at least a major portion of the intake conduit 15 is made integral with the pipe stub.

The right hard end of the filter element 2 in the FIG. is covered by a thermoplastic elastomer which forms on one hand a cover without any specified sealing function and on the other hand an annular portion 17 extending over the inner cylinder liner of the filter element and forming a radial seal in contact with the portion 11a of the pipe stub.

When replacing the main filter 2, the secondary filter 20 prevents dirt from being sucked into the engine if it should be started without the main filter in connection with service. The same applies should the main filter be damaged. The invention has been described in the preceding with reference to an example with a radially sealing primary filter, but it is obvious that the following patent claims also encompass filters with axially sealed primary filters.

We claim:

1. Filter device for filtering a gaseous medium comprising a filter housing with an inlet opening and an outlet opening for the medium, a tubular filter element being enclosed in the housing and disposed between said openings, and a pipe stub coupled to the outlet opening of the housing for coupling to a gas conduit, said pipe stub protruding axially from the outlet opening, characterized in that the pipe stub (11) is detachably joined to the housing (1) and is solidly joined to a secondary filter (20) disposed inside the tubular filter element (2) in order to be removed from the housing together with the secondary filter.

2. Filter device according to claim 1, characterized in that the end of the secondary filter (20) facing the outlet opening (6) is inserted into and is sealing fixed against a portion (11a) of the pipe stub (11) extending into the filter housing, a radial seal (17) on the tubular filter element (2) being in contact with the outer surface of the pipe stub (11).

3. Filter device according to claim 2, characterized in that said end of the secondary filter (20) is surrounded by a sealing ring (22) force fitted against the inner portion (11a) of the pipe stub and in that the inner end edge (11b) of the pipe stub (11) is folded or bent radially inwards.

4. Filter device according to claim 2, characterized in that said end of the secondary filter (20) is glued to the pipe stub (11).

5. Filter device according to claim 1, characterized in that a sealing ring (12) is arranged between the edge of the outlet opening (6) and the pipe stub (11).

6. Filter device according to claim 5, characterized in that the sealing ring (12) has a peripheral groove (13), into which an edge portion (14) around the outlet opening (6) extends, and extends axially over the pipe stub (11) to form a seal against a gas conduit (15) coupled thereto.

* * * * *